United States Patent

Kannegundla et al.

[11] Patent Number: 5,396,290
[45] Date of Patent: Mar. 7, 1995

[54] APPARATUS AND METHOD FOR CONTROLLING A HIGH RESOLUTION CHARGE COUPLED DEVICE IMAGE SENSOR TO PROVIDE ALTERNATIVE MODES OF PICTURE IMAGING

[75] Inventors: Ram Kannegundla, Rochester; Win-Chyi Chang, Penfield, both of N.Y.

[73] Assignee: Eastman Kodak Company, Rochester, N.Y.

[21] Appl. No.: 33,908

[22] Filed: Mar. 19, 1993

[51] Int. Cl.[6] .............................................. H04N 3/15
[52] U.S. Cl. .................................. 348/312; 348/322; 348/555
[58] Field of Search ............... 348/294, 311, 312, 522, 348/446, 322, 555

[56] References Cited

U.S. PATENT DOCUMENTS

| | | | |
|---|---|---|---|
| 4,032,975 | 6/1977 | Malueg et al. | 358/213 |
| 4,399,464 | 8/1983 | Hix et al. | 358/213 |
| 4,740,828 | 4/1988 | Kinoshita | 358/48 |
| 4,800,435 | 1/1989 | Ikeda et al. | 358/213.19 |
| 4,811,106 | 3/1989 | Burt et al. | 358/213.26 |
| 4,928,137 | 5/1990 | Kinoshita | 348/333 X |
| 4,928,137 | 5/1990 | Kinoshita | 358/213.26 |
| 5,070,406 | 12/1991 | Kinoshita | 358/224 |
| 5,264,939 | 11/1993 | Chang | 348/322 |
| 5,287,192 | 2/1994 | Iizuka | 348/311 |

*Primary Examiner*—Joseph Mancuso
*Assistant Examiner*—Wendy R. Greening
*Attorney, Agent, or Firm*—Raymond L. Owens

[57] ABSTRACT

Apparatus and method for controlling a high resolution charge coupled device (CCD) image sensor operate in accordance with a television standard to provide horizontal, vertical, and other CCD control signals to obtain a purely sequential high resolution mode of operation on the one hand. Alternatively, there is a modified mode of operation which provides interlaced even and odd groups of video signals to be viewed directly on a television viewfinder display. The apparatus includes a frequency generator, a standard timing generator, a pixel clock generator, and a small number of additional timers and logic units which are driven by signals from the generators to selectably generate the vertical, horizontal, and other CCD control signals for the alternate modes of operation. The method includes generating a plurality of precisely timed pulses referenced to television standard synchronizing and control signals, and logically combining these pulses and standard signals to generate vertical, horizontal, and other CCD control signals.

11 Claims, 7 Drawing Sheets

APPARATUS AND METHOD FOR CONTROLLING A HIGH RESOLUTION CHARGE COUPLED DEVICE IMAGE SENSOR TO PROVIDE ALTERNATIVE MODES OF PICTURE IMAGING

CROSS REFERENCE TO RELATED PATENT APPLICATIONS

The present invention is related to a pending U.S. patent application Ser. No. 005,323, filed Jan. 15, 1993, which is entitled "Improved Logic System and Method For Controlling Any One Of Different Charge Coupled Device Image Sensors to Provide Video Image Signals in Accordance With a Television Standard," has a common assignee with the present patent application, and has as its inventor, Ram Kannegundla. The present invention is further related to a pending U.S. patent application Ser. No. 005,326, filed Jan. 15, 1993, now U.S. Pat. No. 5,321,509 which is entitled "Apparatus and Method For Controlling a Charge Coupled Device Image Sensor To Provide Sequential Output of Video Image Signals," has a common assignee with the present patent application, and has as its inventor, Ram Kannegundla. The present invention is also related to a pending U.S. patent application Ser. No. 890,895, filed May 29, 1992, now U.S. Pat. No. 5,264,939 which is entitled "Apparatus and Method for Generating Interlaced Viewing Signals for Non-Interlaced Camera System," has a common assignee with the present application, and has as its inventor, Win-Chyi Chang.

FIELD OF THE INVENTION

This invention relates to an electronic apparatus and method for selectively controlling a high resolution charge coupled device (CCD) image sensor to provide video images for display in accordance with a given standard for television on the one hand, and on the other hand, to provide for much higher resolution picture reproduction than the television standard permits.

BACKGROUND OF THE INVENTION

Recent years have seen the rapid development of CCD image sensors and their present widespread use in imaging systems for both amateur and professional applications. Their small size, electrical efficiency, cost effectiveness, etc., have made CCD image sensors the imaging units of choice not only for inexpensive consumer camcorders, but for more critical uses where much higher picture resolution is needed. Depending on their intended uses, CCD image sensors are designed either for sequential (progressive) line-by-line readout of a vertical frame of their image signals, or instead for "interlaced" readout of image signals of first the odd-numbered lines of a vertical frame and then of the even-numbered lines in accordance with a television standard. Where a CCD image sensor is intended for use in much higher resolution imaging than is provided by standard television systems, such as in the electronic printing of color photographs, the CCD image sensor is normally designed for sequential, line-by-line-readout of its image signals. This purely sequential mode of operation is not directly compatible with the "interlaced" mode required for a standard television display.

In order to facilitate the display of video images produced by a CCD sensor on a standard television (TV) display, it is desirable for the CCD sensor to operate in accordance with the same "standard" that the TV display uses. In the United States and a number of other countries the "standard" used for TV is that established by the national television standards committee (NTSC). In Great Britain, Germany, and certain other countries the "standard" is PAL ("phase alternation by line"), while in France and many countries in Eastern Europe the "standard" is SECAM ("sequential chrominance and memory"). While there are differences among the various standards, they all require the display of TV pictures in the form of rapidly scanned horizontal lines of vertical frames. Each vertical frame of a picture represents an instantaneous "snapshot" of the scene being imaged and the frames are displayed in rapid succession as in a motion picture. To further minimize visually apparent flicker in the displayed pictures, each frame thereof is made up of an "odd" and an "even" field superimposed on each other in rapid succession. The horizontal scan lines of an "even" field are precisely interlaced with the horizontal scan lines of an "odd" field, and so on. The NTSC "standard" specifies "525" horizontal scan lines per vertical frame, with "262½" lines for each of the "odd" and the "even" fields. This seemingly complicated way of displaying television images is an outgrowth of the development of commercial broadcast television over the past fifty years to the present time. However, this way has served the test of time and is not easily departed from. A much more complete discussion of television (for black and white as well as color) together with the timing, blanking, synchronizing (sync) signals, etc. required by the NTSC "standard" is given in a book entitled *Basic Television and Video Systems*, by Bernard Grob, published by McGraw-Hill, Inc., Fifth Edition, 1984.

CCD image sensors are well known in the art. Briefly described, a CCD image sensor has horizontal lines and vertical columns of light-sensing cells closely spaced within a given area onto which an image of a scene is optically focused. By way of example, in a CCD image sensor intended for high resolution still picture imaging, there are a thousand or more such cells in each horizontal line and in each vertical column for a total of a million or more cells within an area which may be only a few square centimeters. Each cell represents a very small area, termed a pixel, of the total image; the more pixels present in the CCD image sensor, the finer the resolution (or apparent lack of "grain") in the image reproduced by the CCD image sensor. By way of comparison, there are only about one-quarter-million pixels in a standard television image and, particularly when viewed as a still picture, the "grain" is apparent.

A CCD image sensor may have at the beginning of each horizontal line of cells a small number of cells (termed "Z ref" cells) used for determining a zero signal level. There are also a small number of cells (termed "D ref" cells) for determining a "dark" signal reference level, followed by a large number of "active" cells in the line for producing pixel image signals, and finally at the end of the line there are a few additional "Z ref" cells. One such CCD image sensor commercially available from the Eastman Kodak Co. (Part No. KAI-1000) has a total of 1032 cells in each horizontal line, with 2 "Z ref" cells at the beginning of the line, followed by 10 "D ref" cells, followed by 1014 "active" cells, followed by 6 "Z ref" cells at the end of the line, a total of 1032 cells. There are 1024 horizontal lines of these cells arranged in vertical columns. This is a much larger number of lines per picture frame than the number provided for by the NTSC standard (i.e., 525 horizontal lines per vertical picture frame). This much larger number of horizontal lines provided by such a high resolution CCD image sensor and the need for a sequential mode of operation causes problems in controlling the sensor in accordance with a television standard calling for considerably fewer lines, which lines must also be interlaced in "odd" and "even" fields in each picture frame.

When a high resolution CCD image sensor, such as described above, is used for still picture imaging, the preferred practice is to output the pixel image signals a line at a time in a straight sequence from the first line to the last line of a frame. This sequential outputting, rather than the outputting first of all of the lines of an "odd" field followed by all of the lines of an "even" field, as in standard TV, facilitates the subsequent utilization of the sequential video signals with existing apparatus (e.g., "photo CD" units, color printers, etc.) optimized to provide high resolution reproduction of individual pictures.

It is highly desirable, when producing pictures with an electronic camera, to be able visually to preview the actual pictures being imaged to see that the pictures are properly composed, have balanced light, etc. This is most conveniently done in real time by a viewfinder having a miniature video display. Miniature video display viewfinders operating in accordance with a television standard (i.e., interlaced lines of "odd" and "even" fields of a picture frame) are widely used in consumer camcorders and are very inexpensive. It is desirable therefore, from the standpoint of cost, to be able to use a standard camcorder viewfinder in conjunction with a high resolution CCD image sensor while maintaining the high-resolution capability of the sensor in generating picture images.

Operation of a CCD image sensor is well known in the art and is described briefly hereinbelow to provide a better appreciation of the present invention. The active cells of the CCD image sensor have their stored image signals (each of which corresponds to the light intensity of a small portion of an image) "read" out pixel-by-pixel, line-by-line to provide an electronic video image of a scene. Associated with each column of cells in a CCD image sensor is a separate vertical shift register.

In a sequential mode of operation, which as explained above is the preferred way of operating a high resolution CCD image sensor, at a selected instant of time the pixel image signals then stored in the horizontal lines of cells are simultaneously shifted into respective memory positions of the vertical shift registers. The simultaneous shifting of the multitude of individual pixel signals stored in the CCD cells of the horizontal lines into the respective vertical registers takes place within a short time termed "vertical blank" interval. The pixel signals thus stored in the vertical registers represent all of the horizontal lines of a single vertical picture frame. The pixel signals stored in all of the vertical registers are next shifted down in parallel at precise intervals within the vertical registers horizontal line by horizontal line and into respective memory positions of a line pixel register (horizontal shift register). There is a memory position in the line pixel register for each one of the vertical registers.

After a single horizontal line of pixels from the vertical registers has been shifted into the line pixel register, the image pixels of that horizontal line are clocked out of the line pixel register by a precisely determined cycle of timing pulses (hereinafter termed "pixel clock"). The pixel image signals thus outputted from the line pixel register are applied to other circuitry, such as an analog signal processor (ASP) as is well known in the art. The number of timing pulses in a cycle of the pixel clock corresponds to the number of cells in each horizontal line of cells in the CCD image sensor. This will be explained in greater detail below.

After all of the horizontal lines of pixel image signals of a given picture frame have been shifted into and clocked out of the line pixel register, the pixel image signals for the next frame of a picture stored on the cells of the horizontal lines of the CCD image sensor are simultaneously shifted into the vertical registers and the above-described sequence is repeated line by line for the entire frame. This sequential outputting of image signals of each frame is repeated in succession by precisely synchronized vertical and horizontal control signals applied to the CCD image sensor.

As is well known, a television frequency sub-carrier signal (hereinafter termed "fsc") provides for the decoding and display in proper sequence of the color-components (e.g., red, green and blue) of standard television image signals. This is also explained in detail in the above-identified book by Bernard Grob. To synchronize the pixel image signals in each horizontal line of cells of a CCD image sensor with a television standard, the number of cells in a horizontal line is made a convenient multiple of the television frequency sub-carrier ("fsc"). This will be explained in greater detail hereinafter. For the NTSC "standard", the "fsc" is 3.5795 MHz.

The synchronizing (sync) and control signals for a standard television system (e.g., NTSC) are well suited to the needs of video monitors such as used in camcorder viewfinder displays. Generic standard timing generators specifically designed for producing these "standard" sync and control signals are commercially available off-the-shelf at low cost from a number of companies. However, the standard sync and control signals produced by these commercially available timing generators are not directly usable as the vertical and horizontal control signals needed for a high resolution CCD image sensor, such as described above.

It is desirable from the standpoint of cost and convenience to be able to use such a generic standard timing generator and a miniature video display viewfinder, both of which are readily available commercially, in a high resolution imaging system where sequential read-out of the lines of video signals of a CCD image sensor is required.

It is also desirable to have a simple, inexpensive and versatile imaging system which incorporates a television standard timing generator and a standard viewfinder display along with a high resolution CCD image sensor. The system should provide vertical and horizontal control signals for purely sequential, high resolution readout of the lines of video signals of the CCD image sensor and, alternatively, control signals as needed for viewing in real time of video images from the CCD image sensor in the viewfinder display.

SUMMARY OF THE INVENTION

In accordance with the present invention, in one aspect thereof, there is provided an improved logic system for controlling a high resolution CCD image sensor having a much larger number of horizontal lines of an image frame than the number of lines per frame provided by a standard for television. The logic system provides on the one hand for high resolution outputting of video signals from the CCD image sensor in a purely sequential mode optimized for use by a high resolution picture unit. On the other hand, the logic unit provides for an "interlaced" mode of outputting of lines of video signals from the CCD image sensor so that they are directly displayable on a television viewfinder display. This logic system has a generic timing generator which produces standard sync and control signals as required by a television display. The generic timing generator is driven by a frequency generator whose frequency is made a multiple of a standard frequency sub-carrier ("fsc"). A pixel clock generator, also driven by the frequency generator, provides a pixel clock each cycle of which has a pre-determined number of pixel timing pulses corresponding to the number of cells (pixels) per horizontal line of high resolution CCD image sensor being used with the logic system. Signals from the timing generator and the pixel clock generator are applied to a small number of timers and logic units to provide horizontal, vertical, and other control signals required by the CCD image sensor for its alternative modes of operation. Certain ones of these timers and logic units are selectably controlled to provide horizontal and vertical control signals as needed for a purely sequential line-by-line readout of pixel image signals from the CCD image sensor. Alternatively, the timers and logic units are selectably controlled to provide horizontal, vertical, and other control signals in accordance with a modified ("interlaced") mode of readout of the pixel image signals in which the signals are directly viewable on a standard television display having far fewer horizontal lines than the CCD image sensor.

In accordance with another aspect of the invention, there is provided a method for controlling a high resolution CCD image sensor having a large number of horizontal lines of video signals per frame to obtain a reduced number of lines of video signals synchronized in interlaced groups of even and odd fields for display in accordance with a television standard and alternatively to obtain all of the lines of video signals from the CCD image sensor outputted sequentially for optimum utilization by a high resolution picture unit. The method comprises the steps of generating standard sync and control signals as required by a standard television display, generating a pixel clock, generating a plurality of timed pulses referenced to the standard signals, generating horizontal CCD control signals from a logical combination of the pixel clock and ones of the timed pulses, generating vertical CCD control signals having a selectable number of vertical shift pulses from a logical combination of ones of the timed pulses, generating vertical CCD control signals having a selectable number of frame shift pulses from a logical combination of ones of the timed pulses and the standard signals, generating gate control signals for disposing of selected numbers of horizontal lines of video signals from the CCD image sensor from a logical combination of ones of the standard signals and timed pulses, and selecting the numbers of vertical shift pulses and frame shift pulses in accordance with a purely sequential mode of outputting single horizontal lines of pixel image signals from the CCD image sensor and alternatively selecting the numbers of vertical shift pulses, frame shift pulses and gate control signals in accordance with a modified mode of outputting lines of pixel image signals in interlaced groups of even and odd fields of the television standard.

In accordance with yet another aspect of the invention, there is provided a logic system for generating synchronizing (sync) and control signals in accordance with a television standard and for selectably generating horizontal, vertical, and gate control signals as required by a high resolution charge coupled device (CCD) image sensor having a large number of horizontal lines of video signals for a purely sequential mode of outputting all of the lines of image signals, and alternatively for a modified mode of outputting in which a reduced number of the lines of image signals are viewable directly on a standard television display. The logic system comprises timing generator means, pixel clock generating means, and selectively controlled timing and logic means. The timing generator means generates standard sync and control signals in accordance with a television standard, and is referenced to a standard frequency. The pixel clock generating means provides pixel clock signals having repeating cycles each of which has a pre-determined number of pixel timing pulses in accordance with requirements of the CCD image sensor. The pixel clock generating means is referenced to the standard frequency. The selectably controlled timing and logic means, which is driven by pixel clock and standard sync and control signals, generates horizontal, vertical, and gate control signals for the CCD image sensor as needed for a purely sequential mode of outputting of all of the horizontal lines of pixel image signals of a vertical frame line-by-line from the CCD image sensor and alternatively as needed for a modified mode of outputting from the CCD image sensor of interlaced groups of a reduced number of horizontal lines of pixel image signals in interlaced odd and even fields of vertical frames of a television picture.

The invention will be better understood from a consideration of the following detailed description given in conjunction with the accompanying drawings and claims.

DETAILED DESCRIPTION

Figure 1:
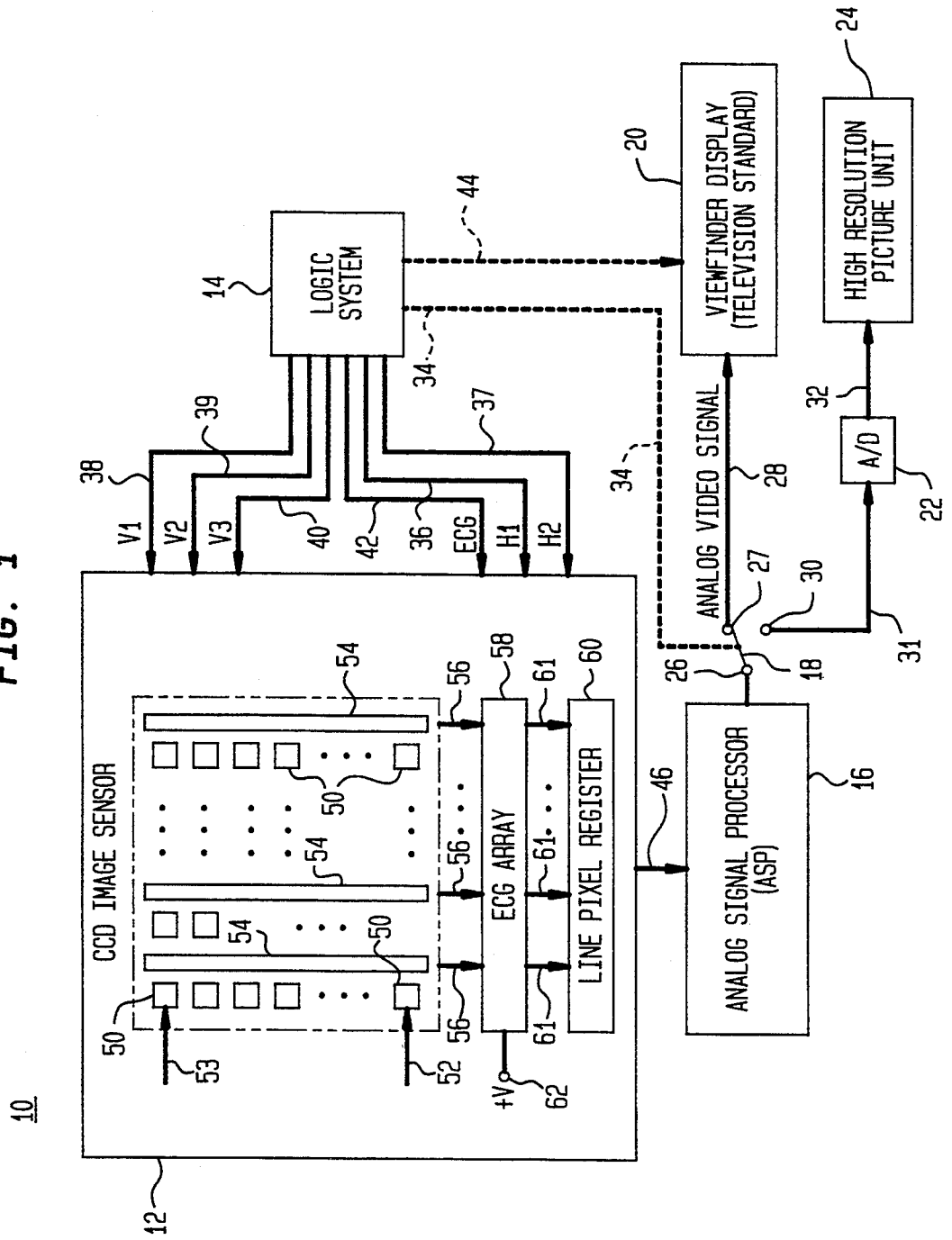
FIG. 1 is a schematic block diagram of a video imaging system in accordance with the present invention.

Referring now to FIG. 1, there is shown a schematic block diagram of a video imaging system 10 in accordance with the present invention. The system 10 comprises a CCD image sensor 12 (shown within a solid-line rectangle and being well known in the art), a novel logic system 14, an analog signal processor (ASP) 16 which is well known in the art, a switch 18, a television viewfinder display 20 which uses a television standard, an analog to digital (A/D) converter 22, and a high resolution picture unit 24. Image signals applied to the picture unit 24 may, for example, be printed out as a high resolution color picture (not shown).

The switch 18 has an input terminal 26 connected to an output of the ASP 16, and has an upper terminal 27 connected via a lead 28 to an input of the display 20. The switch 18 has a lower terminal 30 connected via a lead 31 to an input of the A/D converter 22, and the output of the A/D converter 22 is connected via a lead 32 to an input of the picture unit 24. The switch 18 is actuated by control means (not otherwise shown) indicated by the dashed line 34 which also controls portions of the logic system 14, as will be explained hereinafter.

The logic system 14, which is described in detail hereinafter, applies horizontal control signals H1 and H2 to the CCD image sensor 12 via leads 36 and 37, respectively. The logic system 14 also applies vertical control signals V1, V2 and V3 to the CCD image sensor 12 via leads 38, 39 and 40, respectively. The logic system 14 further applies electronic clock gate (ECG) signals to the CCD image sensor 12 via a lead 42. Sync and control signals (not shown) in accordance with a television "standard" may be applied by the logic system 14 to the viewfinder display 20 via a multi-channel cable 44 (shown by a dashed-line). Pixel image signals outputted from the CCD image sensor 12 are applied via a lead 46 to an input of the ASP 16, and analog video output signals from the ASP 16 at the terminal 26 are applied by the switch 18 either to the viewfinder display 20 or to the A/D converter 22 and thence to the picture unit 24.

The CCD image sensor 12 has drive circuits (not shown) which are well known in the art and which are controlled by the horizontal control signals H1 and H2 (which are complements of each other). The drive circuits are also controlled by the vertical control signals V1 and V2 (which are complements of each other), and by the vertical control signal V3. These horizontal and vertical control signals, and the ECG signals, their relationships to each other, and how they are generated by the logic system 14, are described in detail hereinafter. The horizontal and vertical control signals, and the ECG signals selectably provide for sequential outputting of the lines of pixel image signals of the CCD image sensor 12 in a high resolution mode of operation and alternatively in a modified mode wherein the image signals can be viewed on the viewfinder display 20.

The CCD image sensor 12, as is well known, has a multitude of closely spaced cells 50 arranged in horizontal lines and vertical columns. A first horizontal line of cells 50 is indicated by a horizontal arrow 52, and so on to a last horizontal line of cells indicated by a horizontal arrow 53. These horizontal lines of cells 50 comprise a vertical frame of a picture being imaged by the CCD image sensor 12. In one illustrative sensor 12 there are 1024 horizontal lines of cells 50.

Associated with each vertical column of cells 50 is a respective one of vertical shift registers 54 (only three are shown). In each vertical shift register 54 there are memory positions (not shown) adapted to receive at a selected instant all of the pixel image signals of the cells 50 in a given column. This precisely timed shifting of the pixel image signals from all of the cells 50 into the vertical shift registers 54 is described in greater detail hereinafter.

After the vertical registers 54 have been loaded with all of the horizontal lines of pixel image signals, those pixel image signals (corresponding to the first horizontal line 52) then in the first memory position (not shown) of the vertical registers 54 are, as indicated by short downward arrows 56, shifted in one cycle in parallel to respective positions (not shown) of an electronic clock gate (ECG) array 58. The ECG array 58 can be like the one described in detail in the above-identified U.S. patent application Ser. No. 890,895, filed May 29, 1992 entitled "Apparatus and Method for Generating Interlaced Viewing Signals for Non-Interlaced Camera System", which patent application is incorporated by reference into the present application. Briefly described, the ECG array 58 serves as an electronic switch under control of ECG signals applied via the lead 42 from the logic system 14, as is described in detail hereinafter.

In a controlled first state of the ECG array 58 (ECG signal absent), pixel image signals applied to it from the vertical registers 54, as indicated by the downward arrows 56, pass through (or bypass) the ECG array 58 and are loaded into respective memory positions (not shown) of a line pixel register 60, as indicated by the downward arrows 61. The first state of the ECG array 58 is the normal one during the high resolution, sequential mode of operation of the CCD image sensor 12.

There is a respective memory position (not shown) in the line pixel register 60 for receiving the output of each one of the vertical registers 54. After the line pixel register 60 has been loaded in a given cycle with the pixel image signals of a single horizontal line (e.g., the first line 52), the pixel image signals of that line are clocked out of the line pixel register 60 pixel-by-pixel and applied via the lead 46 to the ASP 16. This horizontal readout operation of the line pixel register 60 is controlled by the horizontal control signals H1 and H2 applied to the CCD image sensor 12, as will be explained in detail hereinafter.

The sequential line-by-line shifting into and readout of pixel image signals from the line pixel register 60 continues until the last horizontal line 53 of pixel image signals have been outputted to the ASP 16. At this point the vertical registers 54 are now empty. Then another precisely timed vertical control signal applied to the CCD image sensor 12 simultaneously shifts all of the next pixel image signals from all of the horizontal lines of cells 50 into the vertical registers 54. After this, the above-described sequence is repeated in clocking the pixel image signals out of the line pixel register 60, sequentially line-by-line, until all of the horizontal lines of the CCD image sensor 12 have been outputted, and so on.

In a controlled second state of the ECG array 58 (ECG signals present), selected lines of pixel image signals applied to it from the vertical registers 54, as indicated by the downward arrows 56, are "dumped" or drained off to a source, such as a terminal 62 (+V) and do not reach the line pixel register 60. Thus, depending upon the presence or absence of an ECG signal on the lead 42, a horizontal line of pixel image signals is either applied through the ECG array 58 to the line pixel register 60 or else "dumped" and not used.

It is important to note that the vertical and horizontal control signals and the ECG signals applied to the CCD image sensor 12 by the logic system 14 are precisely referenced with respect to standard sync and control signals required by the viewfinder display 20. Thus video signals from the CCD image sensor 12 and the ASP 16 in a modified mode of operation of the imaging system 10 are directly viewable on the viewfinder display 20. In another, purely sequential, mode of operation the video signals outputted as consecutive lines of pixel image signals from the CCD image sensor 12 and the ASP 16 are directly usable with the A/D converter 22 and the high resolution picture unit 24. This desirable result is obtained in a very effective way by the simple and inexpensive apparatus and method provided by the present invention.

Figure 2:
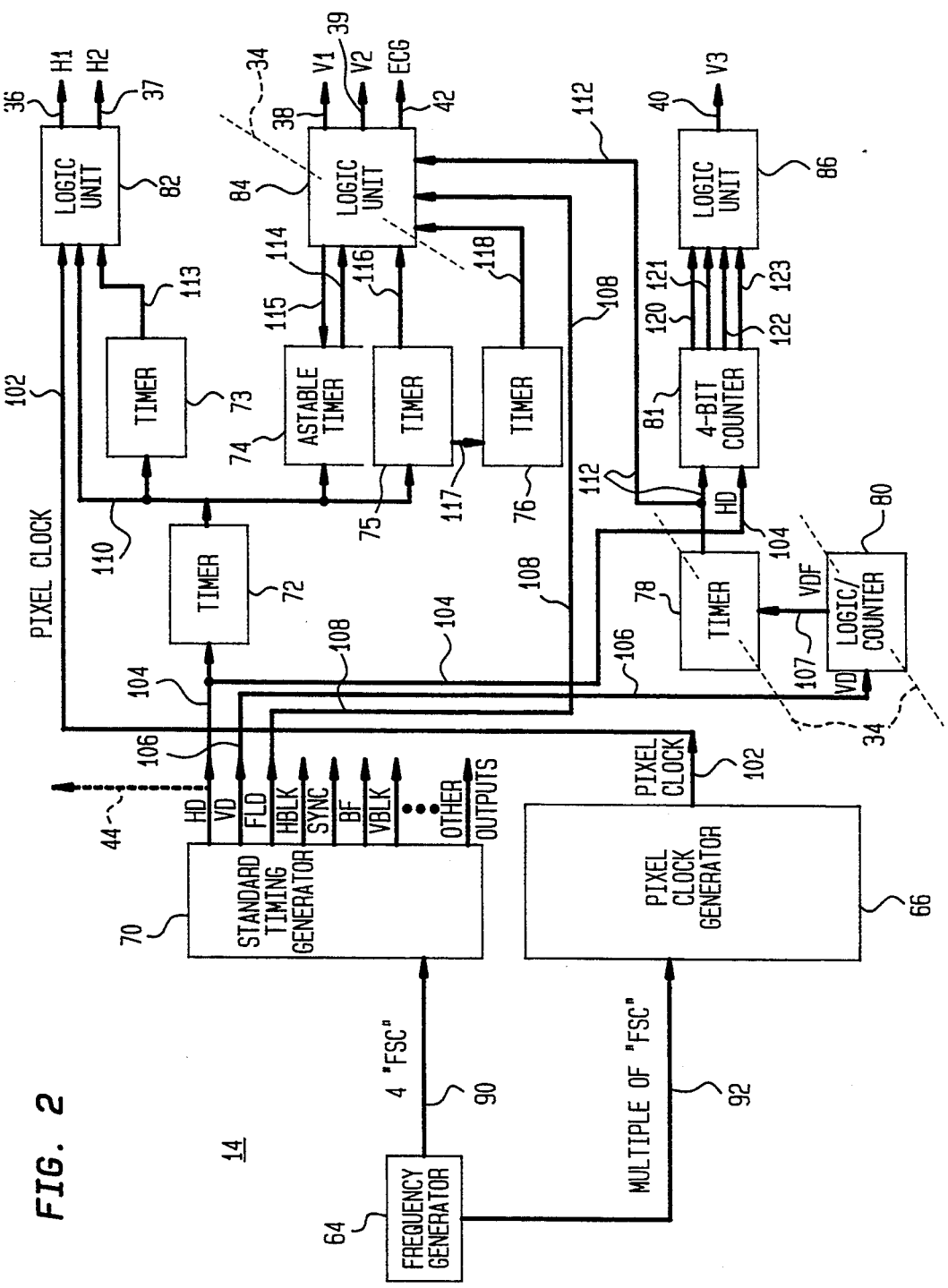
FIG. 2 is an illustrative schematic diagram of a logic system of FIG. 1 in accordance with the present invention.

Referring now to FIG. 2, there is shown an illustrative schematic diagram of the logic system 14 of FIG. 1 in accordance with the present invention. The logic system 14 comprises a frequency generator 64, a pixel clock generator 66, a standard timing generator 70, a timer 72, a timer 73, an astable timer 74, a timer 75, a timer 76, a timer 78, a logic/counter 80, a 4-bit counter 81, a logic unit 82, a logic unit 84 and a logic unit 86. By way of example, the sync and control signals generated by the standard timing generator 70 described hereinafter are in accordance with the NTSC standard.

The logic system 14 outputs to the CCD image sensor 12 of FIG. 1 horizontal control signals H1 and H2, via the leads 36 and 37, respectively, the vertical control signals V1, V2, and V3 via the leads 38, 39 and 40, respectively, and the ECG signals via the lead 42. Required ones of the sync and control signals generated by the timing generator 70 may be outputted from the logic system 14 to the viewfinder display 20 of FIG. 1 by the multi-channel cable 44 (shown as a dashed line).

The frequency generator 64 operates at a pre-determined multiple of a standard frequency sub-carrier "fsc" (e.g., 12 "fsc"). In accordance with the NTSC standard, an output signal of 4 "fsc" from the generator 64 is connected via a lead 90 to an input of the standard timing generator 70. The timing generator 70 is thus synchronized with a four times multiple of the "fsc" (i.e., 14.3182 MHz).

A signal having a frequency of a selected multiple of "fsc" is applied via a lead 92 from the frequency generator 64 to the pixel clock generator 66. In the above-identified patent application, entitled "Improved Logic System And Method For Controlling Any One of Different Charge Coupled Device Image Sensors to Provide Video Image Signals In Accordance With A Television Standard", (file no. KOD62621A), there is described in detail how the signal frequency applied via the lead 92 to the pixel clock generator 66 is selected to correspond to the number of pixels (cells 50) in a horizontal line of the CCD image sensor 12. This patent application is incorporated by reference herein. By way of example here, the frequency of the signal on the lead 92 is selected to be 6 times "fsc" when the CCD image sensor 12 has 1032 cells 50 per horizontal line.

The pixel clock generator 66 generates a pixel clock, described in detail hereinafter, which is outputted onto a lead 102. During each cycle of the pixel clock the pixel clock generator 66 generates a train of pixel pulses, which, as was explained previously, correspond in number to the number of cells 50 in a horizontal line thereof in the CCD image sensor 12. The pulses of the pixel clock applied to the lead 102 are, as will be explained hereinafter, precisely referenced to each other and to the beginning and ending of each horizontal line of pixel image signals from the line pixel register 60 of FIG. 1 in accordance with the television (NTSC) standard.

The standard timing generator 70 (which may be purchased off-the-shelf at low cost) generates a number of sync and control signals and applies them to respective output leads. Principal ones of these signals are identified here as: "horizontal drive" (HD), "vertical drive" (VD), "odd and "even" field indicator" (FLD), "horizontal blank" (HBLK), "synchronizing" (SYNC), "burst flag" (BF), and ""vertical blank"" (VBLK). Other signals not specifically identified herein may also be generated by the generator 70. Certain ones of the identified signals HD, VD, FLD, etc. and their time relationships to other signals generated by the logic system 14 are described in greater detail hereinafter.

The HD signal from the timing generator 70 is applied via a common lead 104 to an input of the timer 72 and to one input of the 4-bit counter 81. The VD signal from the timing generator 70 is applied via a lead 106 to an input of the logic/counter 80. An output signal (hereinafter identified as "VDF") from the logic/counter 80 is applied via a lead 107 to an input of the timer 78. The FLD signal from the timing generator 70 is applied via a lead 108 to an input of the logic unit 84. The pixel clock from the pixel clock generator 66 is applied via the lead 102 to one input of the logic unit 82. An output of the timer 72 is applied via a common lead 110 to another input of the logic unit 82, to an input of the timer 73, to an input of the astable timer 74, and to an input of the timer 75.

An output of the timer 78 is applied via a common lead 112 to one input of the 4-bit counter 81, and to one input of the logic unit 84. An output of the timer 73 is applied via a lead 113 to another input of the logic unit 82. An output of the astable timer 74 is applied via a lead 114 to another input of the logic unit 84; and a control signal from the logic unit 84 is applied via a lead 115 to another input of the astable timer 74. An output of the timer 75 is applied via a lead 116 to another input of the logic unit 84, and another output of the timer 75 is applied via a lead 117 to an input of the timer 76. An output of the timer 76 is applied via a lead 118 to another input of the logic unit 84.

Four outputs of the 4-bit counter 81 are applied by respective ones of leads 120, 121, 122 and 123 to separate inputs of the logic unit 86. The operation of the portion of the logic system 14 comprising the timers 72, 73, 75, 76 and 78, the astable timer 74, the logic/counter 80, the 4-bit counter 81, the logic units 84, and 86, will be described in greater detail hereinafter. These various timers, counters, and logic units are easily assembled by a person skilled in the art from well known components which may be purchased off-the-shelf at low cost.

Figure 3:
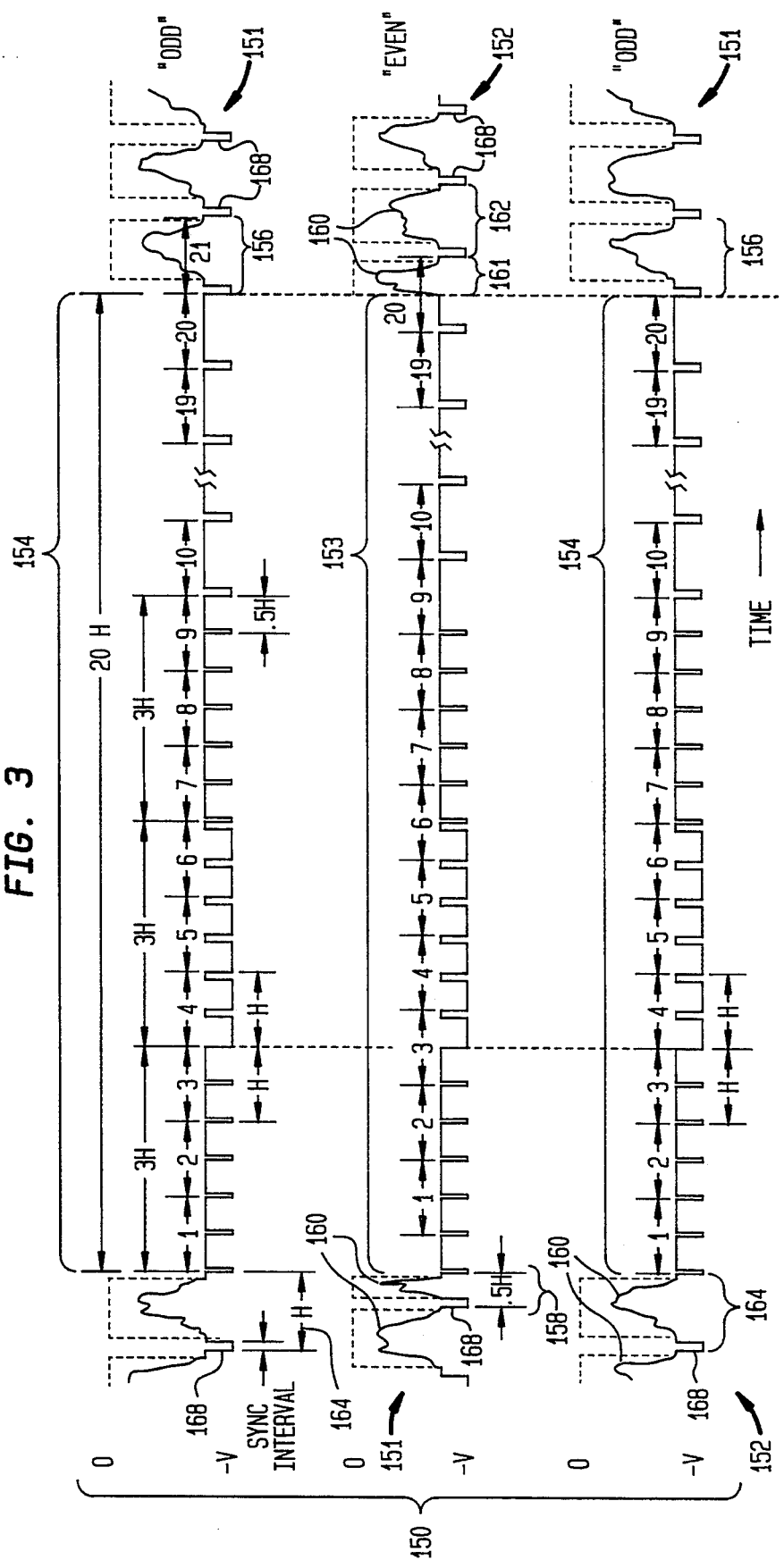
FIG. 3 is a schematic diagram of video image signals provided in accordance with the NTSC standard.

Referring now to FIG. 3, there is shown, by way of background explanation, television signals schematically indicated at 150 and provided in accordance with the NTSC standard. A much more complete discussion of television signals is to be found in the above-identified book by Bernard Grob. Time is indicated here along a horizontal axis and relative signal amplitude in volts along a vertical axis. The signal 150 is displayed sequentially line-by-line as an "odd" field indicated at 151, an "even" field indicated at 152, and "odd" field at 151, and so on. It is noted that only the beginning and ending portions of the "odd" and "even" fields are shown. The end of an "odd" field 151 and a next "even" field 152 are separated by a ""vertical blank"" interval indicated at 153, and the end of an "even" field 152 and a next "odd" field 151 are separated by a "vertical blank" interval 154. Various synchronizing pulses shown during the "vertical blank" intervals 153 and 154 are well known in the art and are not further described herein.

During each "vertical blank" interval 153 or 154, twenty horizontal lines "H" (20 H) of the video portion of the signal 150 are blanked out. This provides time for vertical retrace from the end of one field to the beginning of the next, and so on. There are "262½" horizontal lines H in each of the fields 151 and 152 for a total of "525" lines in a vertical frame of the television picture. The frames are repeated 30 times a second, with the two fields thereof repeated at 60 times per second.

Beginning with the twenty-first line H, as indicated at 156, of an "odd" field 151, two hundred forty two full lines of the television signal 150 are displayed, followed by one half of a line H indicated at 158 at the end of an "odd" field 151. The video portion of the signal 150 during a horizontal line is indicated at 160. At the end of an "odd" field there is another "vertical blank" interval 153 followed by one-half of the twentieth line H indicated at 161 of the next "even" field 152. This half-line 161 is followed by a full twenty-first line, as indicated at 162, of the "even" field, and so on. Each "even" field ends in a full line, as indicated at 164, and then another "vertical blank" interval 154 begins. The time duration of a full line H, such as indicated at 156, 162 and 164, is termed "one line time". Each line H is initiated by a horizontal line sync pulse 168 applied during a very short "sync interval". It is to be noted that the horizontal line sync pulses 168 for each "odd" field are offset by a half line-time with respect to the line sync pulses 168 for an "even" field. Thus an "odd" field 151 ends with a half-line as indicated at 158 and an "even" field 152 begins with a half-line as indicated at 161, and so on.

Figure 4:
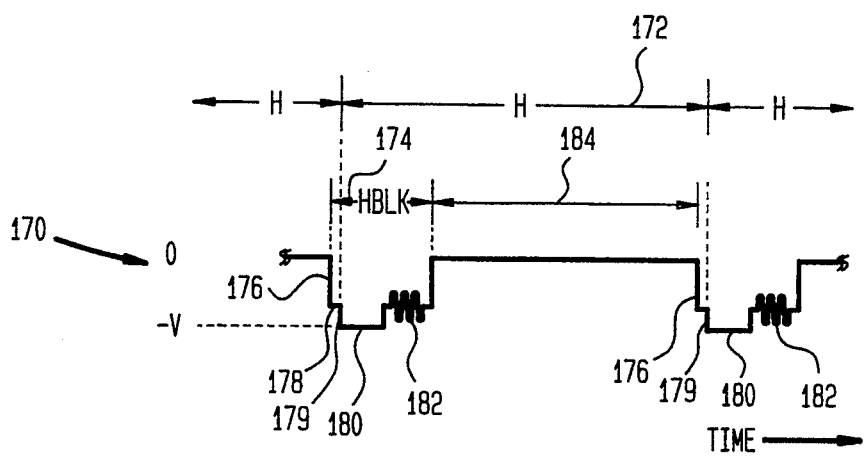
FIG. 4 is an waveform illustrating portions of a video signal for one standard horizontal line of a vertical frame.

Referring now to FIG. 4, there is shown greatly enlarged a waveform 170 of the end of one horizontal line H of a television signal (e.g., the signal 150 of FIG. 3), the following full horizontal line H of the signal from beginning to end, and the beginning portion of the next line H. Time is indicated to scale along a horizontal axis, and arbitrary signal voltage amplitude relative to zero along a vertical axis. For the sake of illustration, the video portion (e.g., the portion 160 of FIG. 3) of the waveform 170 is shown at zero amplitude. The time duration of one line (H) is indicated by the horizontal line 172 having arrow heads at the ends thereof. This line time 172 corresponds to the duration of the full lines 156, 162 and 164 of FIG. 3. In accordance with the NTSC standard, the line time 172 is 63.5 microseconds.

Shortly before the beginning of a line H there is an interval termed "horizontal blank" (HBLK) as indicated at 174. During the HBLK interval 174 there is a combined pulse 176. The combined pulse 176 has a level at 178 at which blanking of the video portion 160 of the television signal 150 (FIG. 3) occurs. The pulse 176 has a transition 179 to a sync pedestal 180, which corresponds to a horizontal sync pulse 168 (FIG. 3). At the end of the sync pedestal 180 the combined pulse 176 has a short oscillating portion 182, termed "burst flag" (BF), by which the color components of the video signal are decoded. The BF portion 182 comprises a number of oscillations of the standard frequency sub-carrier "fsc", as is well known in the art. A BF signal, like the BF portion 182, is generated by the timing generator 70. After the HBLK interval 174 there is an active portion 184 of the line H extending to the next HBLK interval 174, during which video image signals (not shown here) are displayed. The active line portion 184 has a time of 55.31 microseconds according to the NTSC standard. The video pixel image signals, (e.g., the video portion 160 of FIG. 3), are outputted, as was explained previously, from the line pixel register 60 of FIG. 1 pixel image signal by pixel image signal corresponding to a horizontal line of cells 50 in the CCD image sensor 12. To obtain from the CCD image sensor 12 properly synchronized signals for each line (such as illustrated at 156, 158, 161, 162 and 164 in FIG. 3), it is essential that the pixel clock applied to the lead 102 (FIG. 2) have the proper number of pixel timing pulses (corresponding to the number of cells 50 in a horizontal line) and that each cycle of the pixel clock be precisely referenced to the line time 172, and to the active line interval 184 of FIG. 4. Also, during each HBLK interval 174, a horizontal line of pixel image signals must be shifted at a precisely synchronized instant from the vertical registers 54 of the CCD image sensor 12 into the line pixel register 60 of FIG. 1.

Figure 5:
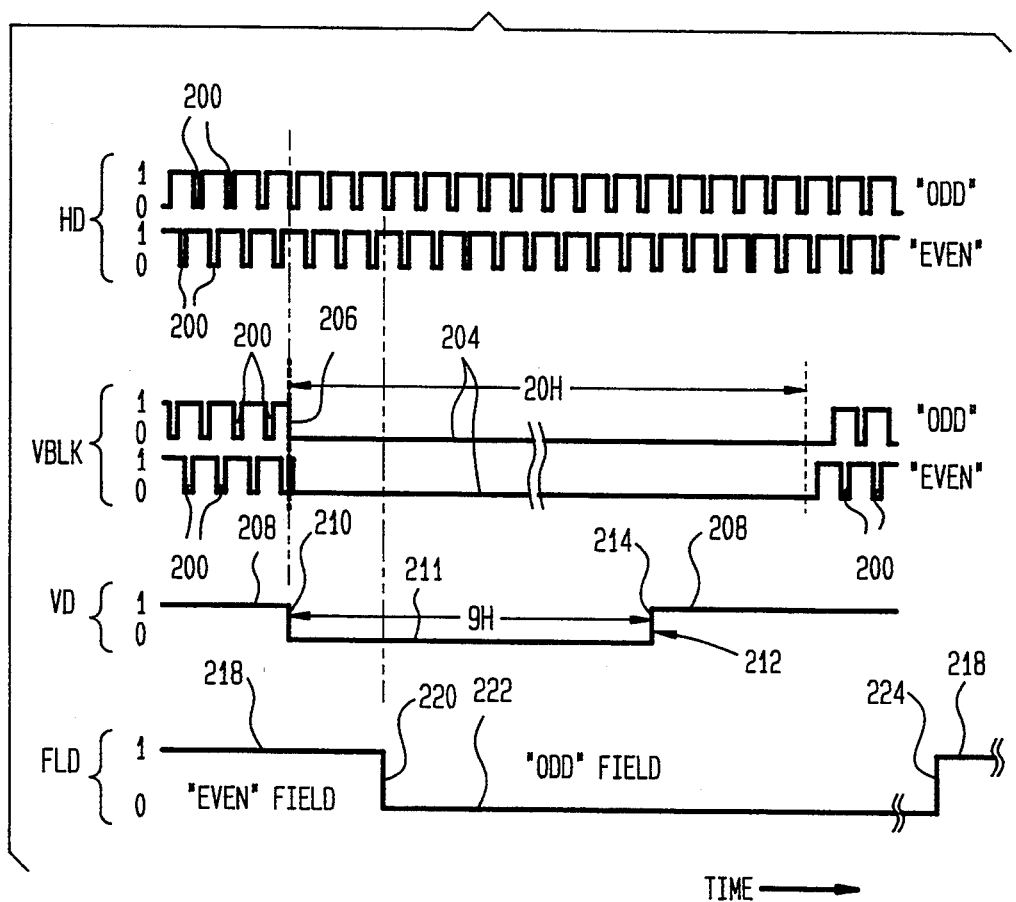
FIG. 5 shows in schematic form certain standard sync and control signals generated by a timing generator in accordance with the NTSC standard.

Referring now to FIG. 5, there are schematically shown certain of the standard output signals generated by the timing generator 70 of FIG. 2. Time is indicated along a horizontal axis and signal logic levels of binary "0" and "1" along a vertical axis. These signals are only briefly described herein since they are well known. A first one of the signals shown here is the horizontal drive (HD) signal which (see also FIG. 2) is applied to the lead 104. The HD signal comprises a series of sync pulses 200 which are evenly spaced by "one line time" (i.e., the line time 172 of FIG. 4) and which correspond to the horizontal sync pulses 168 (FIG. 3). It is noted that the HD sync pulses 200 shown here for an "even" field are offset by one-half of the line time 172 relative to the HD sync pulses 200 for an "odd" field. This conforms with the evenly spaced timing of the standard horizontal sync pulses 168 previously described (FIG. 3).

A "vertical blank" (VBLK) signal generated by the timing generator 70 (applied to an output lead identified as VBLK in FIG. 2) has a twenty-line (20 H) blanking interval indicated at 204 for both the "odd" and "even" fields. The blanking intervals 204 begin at a transition indicated at 206 and are referenced to the HD sync pulses 200 for the "odd" and "even" fields, as shown. These blanking intervals 204 correspond to the standard vertical blank intervals 153 and 154 (FIG. 3).

A vertical drive (VD) signal (applied to the lead 106 in FIG. 2) has a first level (shown as logic "1") indicated at 208 which at a transition 210 goes to a second level (shown as logic "0") 211 to form a pulse 212. The transition 210 is matched in time with the transition 206 of the VBLK signal. The second level 211 of the VD signal pulse 212 has a duration of nine line-times (9 H) after which the VD signal at a transition 214 returns to the first level 208.

An "odd" and "even" field indicator (FLD) signal (applied to the lead 108 in FIG. 2) has a first level (logic "1") 218 (indicating an "even" field) which at a first transition 220 goes to a second level (logic "0") 222 (indicating an "odd" field). At the end of an "odd" field the FLD signal goes from the second level 222 at a second transition 224 back to the first level 218. The first transition 220 of the FLD signal occurs three linetimes after the transition 210 of the VD signal, as does the second transition 224.

Synchronizing (SYNC) signals generated by the timing generator 70 and applied to an output lead (identified as SYNC in FIG. 2) are not shown herein but correspond to the standard sync pulses 168 and other sync pulses (not numbered) within the "vertical blank" intervals 153 and 154 (FIG. 3). Similarly, other signals generated by the timing generator 70 are not illustrated herein but are well known in the art.

Figure 6:
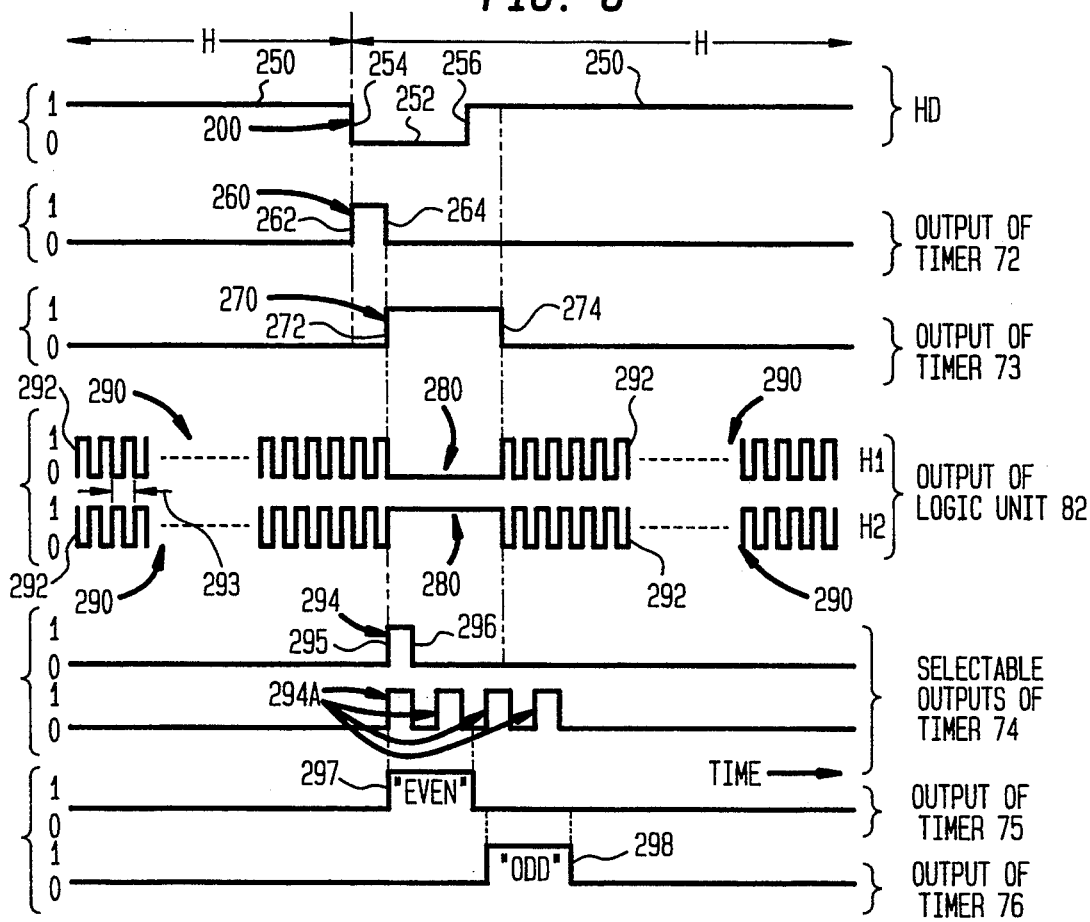
FIG. 6 is a schematic illustration of certain timed pulses and shows a logical combination of pulses and a pixel clock to provide horizontal control signals in accordance with the invention for a CCD image sensor of FIG. 1.

Referring now to FIG. 6, there are shown in schematic form some important time relationships of various signals and timed pulses generated within the logic system 14 of FIG. 2. Time is shown along a horizontal axis and signal logic levels of "0" and "1" are shown along a vertical axis. A single sync pulse 200 of the HD signal (see also FIG. 5) is shown going from a first level ("1") 250 to a second level ("0") 252 at a transition 254, and then at a later transition 256 back to the level 250. The transition 254 marks the beginning of the next line H and the end of the previous line, as indicated. The exact relationship of the sync pulses 200 of the HD signal to the standard sync pulses 168 of FIG. 3, the HBLK intervals 174 (FIG. 4), and the VBLK intervals 204 of FIG. 5 has previously been described.

Shown positioned below the sync pulse 200 is a precisely timed pulse 260 which is generated by the timer 72 of FIG. 2 at the beginning of each HD signal pulse 200. The timed pulse 260 begins at a transition 262 (coincident with the transition 254) and ends shortly afterward at a transition 264 even though the sync pulse 200 is still present (i.e., at a "0"). The pulse 260 is applied to the lead 110 of FIG. 2.

The trailing edge (transition 264) of the timed pulse 260 triggers the timer 73 of FIG. 2 which produces a timed pulse 270. The pulse 270 begins at a transition 272 and ends at a transition 274. It is noted that the transition 272 occurs at the same time as does the transition 264, and that the transition 274 occurs somewhat after the transition 256 of the HD sync pulse 200. Thus the timed pulse 270 (which is applied via the lead 113 to an input of the logic unit 82 in FIG. 2) begins only after a precisely set interval (determined by the pulse 260) after a HD sync pulse 200 occurs. The timed pulse 270 continues for a precisely set interval (determined the timer 73) until shortly after the HD sync pulse 200 has ended.

The pulses 260 (from timer 72), the pulses 270 (from timer 73), and the pixel clock on the lead 102 (FIG. 2) are logically combined, in a way well known in the art, in the logic unit 82 to produce an output horizontal control signal H1 and its complement H2. As schematically illustrated in FIG. 6, the horizontal control signal H1 (with logic levels "0" and "1"), and the complementary horizontal control signal H2, (with logic levels "0" and "1") has a "blanked-out" portion 280 during which the pixel clock indicated at 290 is interrupted.

It is to be understood, of course, that the blanked-out portion 280 and the pixel clock 290 in the control signal H2 are the complements of the blanked-out portion 280 and the pixel clock 290 in the control signal H1. The pixel clock 290 comprises evenly spaced pixel timing pulses 292. The pixel timing pulses 292 are in the form of a square wave having a 50% duty cycle and a period indicated at 293. For a drive signal of 6 "fsc" applied to the pixel clock generator 62, the period 293 is "one" divided by 6 "fsc". Each timing pulse 292 in the horizontal control signals H1 and H2 drives the line pixel register 60 of FIG. 1 to output a single pixel image signal. There are provided here as many timing pulses 292 in a single cycle of the horizontal control signals H1 and H2 as are required to output from the line pixel register 60 all of the active pixel image signals as well as the beginning and ending "D ref" and "Z ref" signals from a horizontal line of cells 50 of the CCD image sensor 12. The exact position and duration of the "blanked-out" intervals 280 within the horizontal control signals H1 and H2 are referenced as shown to the HD sync pulses 200.

Shown below the horizontal control signals H1 and H2 of FIG. 6 is a timed pulse 294 having logic levels of "0" and "1". The pulse 294 (generated by the astable timer 74 of FIG. 2) begins at a transition 295 which coincides with the transition 264 at the end of the pulse 260. The pulse 294 ends at a transition 296. The interval defined by the pulse 294 is thus precisely referenced to the HD signal pulse 200, to the timed pulse 260 (timer 72) and to the interval 280 of the horizontal control signals H1 and H2. The single pulse 294 is selectably generated by the astable timer 74 under control (via the lead 115) from the logic unit 84.

Shown positioned below the pulse 294 is a waveform comprising four pulses 294A which are also selectably generated by the astable timer 74. When selected, the first of the pulses 294A is generated in time instead of the pulse 294, and the second, third and fourth pulses 294A occur at even intervals after the first pulse 294A, as shown.

The logic unit 84 (FIG. 2) has a signal selector (not shown) which is actuated by the control means 34 (indicated by the dashed line) in unison with the switch 18 of FIG. 1. When the switch 18 is in the "up" position shown (i.e., the terminal 26 connected to the terminal 27), analog video signals from the ASP 16 are applied to the viewfinder display 20. The signal selector (not shown) in the logic unit 84 at this time applies via the lead 115 a control signal to the astable timer 74 which commands it to output the four pulses 294A via the lead 114 to the logic unit 84. Alternatively, when the switch 18 is set in its "down" position (i.e., the terminal 26 connected to the terminal 30) by the control means 34, the signal selector (not shown) in the logic unit 84 applies via the lead 115 to the astable timer 74 a control signal which commands the timer 74 at this time to output only a single pulse 294. The single pulse 294 and alternatively the four pulses 294A are referenced to the HD signal pulses 200 as shown.

Shown by way of reference below the four pulses 294A, is a pulse 297 which is generated by the timer 75 in response to the timer 72. Another pulse 298, shown below and to the right of the pulse 297, is generated by the timer 76 in response to the timer 75. The beginning of the pulse 297 is referenced to the ending transition 264 of the pulse 260, and the duration of the pulse 297 is greater than the time taken by the first two of the four pulses 294A. Similarly, the pulse 298 begins after the ending of the pulse 297 which is shortly before the beginning of the third pulse 294A. The pulse 298 ends after the fourth pulse 294A ends. Thus the pulse 297 endures for the interval of the first two of the four pulses 294A, and the pulse 298 endures for the interval of the third and fourth of the pulses 294A. As will be explained hereinafter, the pulses 297, or the pulses 298, are selectably chosen by the logic unit 84 and applied as the ECG signals to the lead 42. These ECG signals selectably control the ECG array 58 of the CCD image sensor 12 during the modified mode of operation, as is also explained hereinafter.

In response to a single pulse 294, a single horizontal line of pixel image signals in the vertical registers 54 of the CCD image sensor 12 of FIG. 1 is shifted through the ECG array 58 (ECG signals are absent) into the line pixel register 60. On the other hand, in response to four of the pulses 294A, four successive horizontal lines of pixel image signals are shifted to the ECG array 58. Then, under control of an ECG signal applied to it, the ECG array 58 selectably shifts a successive two of the four lines one on top of the other into the line pixel register 60, and "dumps" (drains off to a source) the two other successive horizontal lines of pixel image signals. This selective grouping of the four horizontal lines as they are shifted out of the vertical registers 54 and into and out of the ECG array 58 will be explained in detail hereinafter. This selective shifting, in effect, combines the two lines which are entered into the line pixel register 60 into a "composite line" of pixel image signals to be shifted as a single line out of the line pixel register 60. The single pulses 294, and alternatively the four pulses 294A, are hereinafter referred to as "vertical shift" pulses. A precisely numbered sequence of the vertical shift pulses 294 (or the pulses 294A) comprises a cycle of a vertical clock (to be described shortly).

There are, in the high-resolution mode of operation of the imaging system 10 (switch 18 "down"), as many of the single vertical shift pulses 294 in a cycle of the vertical clock as there are horizontal lines of pixel image signals of the CCD image sensor 12 to be shifted sequentially line-by-line into the line pixel register 60 of FIG. 1. By way of example, where the CCD image sensor 12 has "1024" horizontal lines of cells 50, there are 1024 of the single vertical shift pulses 294 in a cycle of the vertical clock. During a cycle of the vertical clock the lines of pixel image signals are shifted down the vertical registers 54 in sequence by the vertical shift pulses 294 and outputted through the ECG array 58 (no ECG signals are present) to the line pixel register 60 and thence to the ASP 16. For this purely sequential mode of operation of the imaging system 10, the switch 18 is in its "down" position and the analog video signals from the ASP 16 are applied to the A/D converter 22 and thence to the high resolution picture unit 24. The duration of this cycle of the vertical clock (with 1024 single vertical shift pulses 294) corresponds in length of time to the odd-field and even-field portions of two "frames" of a standard television picture (e.g., 15 frames per second).

On the other hand, in a modified mode of operation of the imaging system 10 in accordance with the present invention, when the switch 18 is put into its "up" position by the control means 34, the logic unit 84 is conditioned by the control means 34 to apply via the lead 115 a control signal (not shown) to the astable timer 74 which causes the astable timer 74 to output onto lead 114 the four vertical shift pulses 294A (FIG. 6), instead of a single pulse 294. On the occurrence of the four pulses 294A, four horizontal lines of pixel image signals are shifted line-by-line out of the vertical register 54 to the ECG array 58. Following the example given above, where there are "1024" horizontal lines in the CCD image sensor 12, "256" quadruples of the pulses 294A sequentially shift in quadruples all of the horizontal lines of pixel image signals into the ECG array 58. From there the lines are selectably shifted in pairs (under control of the ECG signals) to the line pixel register 60 and the other pairs of lines drained away and not used.

Figure 7:
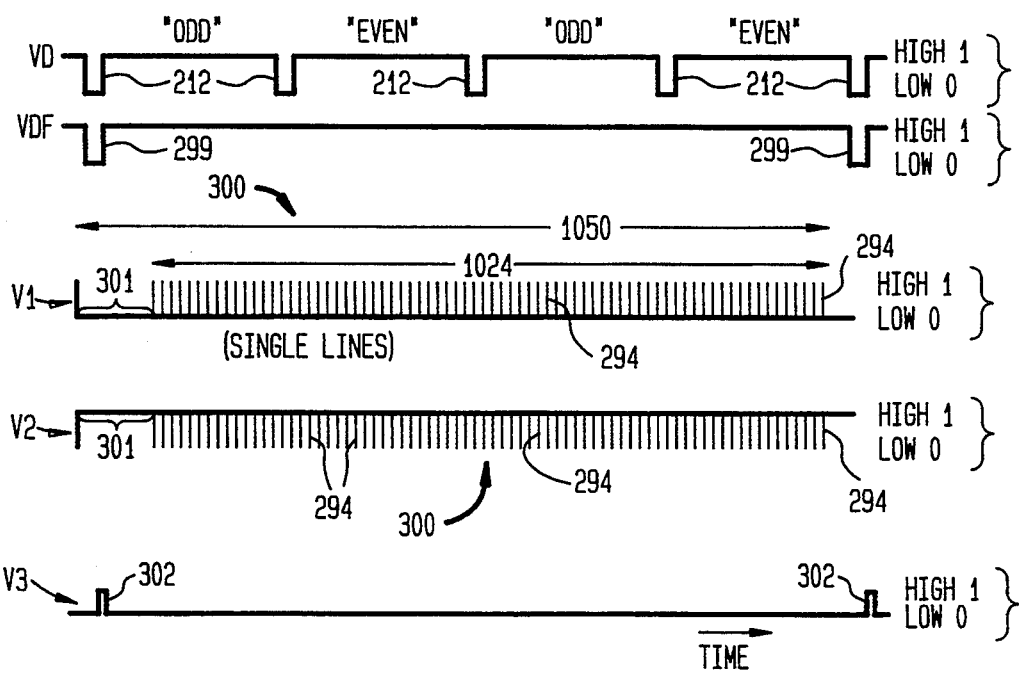
FIG. 7 is a schematic illustration of vertical control and other signals provided in accordance with the present invention for a purely sequential mode of operation of the CCD image sensor of FIG. 1.

Referring now to FIG. 7, there are shown (not to scale) time relationships of various signals generated by the logic system 14 of FIG. 2 for a purely sequential mode of operation of the CCD image sensor 12. Time is indicated along a horizontal axis and logic levels "high" (a "1") and "low" (a "0") along a vertical axis. The switch 18 is in its "down" position and single pulses 294 are generated. Evenly spaced VD signal pulses 212 (see also FIG. 5), and their relationship to the "odd" and "even" fields of two frames of a standard TV picture are as shown here. These VD pulses 212 (five shown) are applied via the lead 106 to the logic/counter 80 (FIG. 2). During a time corresponding to the "odd" and "even" fields of two standard TV picture frames ("1050" lines in total), all of the horizontal lines of pixel image signals of a vertical frame (e.g., 1024 lines) are sequentially outputted line-by-line from the CCD image sensor 12.

Shown (for the sake of explanation) positioned below the VD signal pulses 212 are VDF signal pulses 299 (two being shown), the vertical control signals V1 and V2 (which are complements of each other), and the vertical control signal V3. The vertical control signals V1 and V2 comprises a vertical clock 300, one cycle of which has, for example, "1024" of the single vertical shift pulses 294 (only a nominal number of which are actually depicted). As will be explained in detail shortly, there is a blanked-out interval indicated at 301 at the beginning of the vertical control signals V1 and V2.

The VDF signal (lead 107 of FIG. 2) comprises a sequence of pulses 299 which are referenced to the VD signal pulses 212 and are selectively generated by the logic/counter 80 in response to the VD signal pulses 212 applied to its input. For a purely sequential mode of operation (switch 18 "down"), the logic/counter 80 is set by the control means 34 to output only one VDF pulse 299 for every four VD pulses 212, as shown here.

The vertical control signal V3 comprises a sequence of pulses 302 which, as will be explained shortly, are generated by the logic unit 86, being referenced to the VDF signal pulses 299. There is a V3 pulse 302 on the occurrence of each VDF pulse 299. On the occurrence of each V3 signal pulse 302 (lead 40), all of the horizontal lines of pixel image signals are shifted into the vertical registers 54 of the CCD image sensor 12. Thereafter the pixel image signals are outputted sequentially line-by-line from the CCD image sensor 12 as was explained previously. The pulses 302 are hereinafter referred to as "frame shift" pulses.

By way of example, there are five VD signal pulses 212 illustrated in FIG. 7. Corresponding to a first of these pulses 212 (shown at the beginning of an "odd" field) there is a V3 signal pulse 302 (generated by the logic unit 86) which causes the shifting of all of the lines of pixel image signals into the vertical registers 54 of the CCD image sensor 12. In the interval during which all of these lines (e.g., 1024 lines) are sequentially shifted line by line into the line pixel register 60, there occur three additional VD signal pulses 212 (corresponding to succeeding "even", "odd", and "even" fields of standard TV picture frames) but no V3 pulses 302. This non-occurrence of three V3 pulses 302 provides sufficient time for the sequential shifting by the single vertical shift pulses 294 of all 1024 horizontal lines of pixel image signals. Then, there is another V3 pulse 302 at the beginning of a fifth (another "odd" field) interval, and the sequence repeats.

Figure 8:
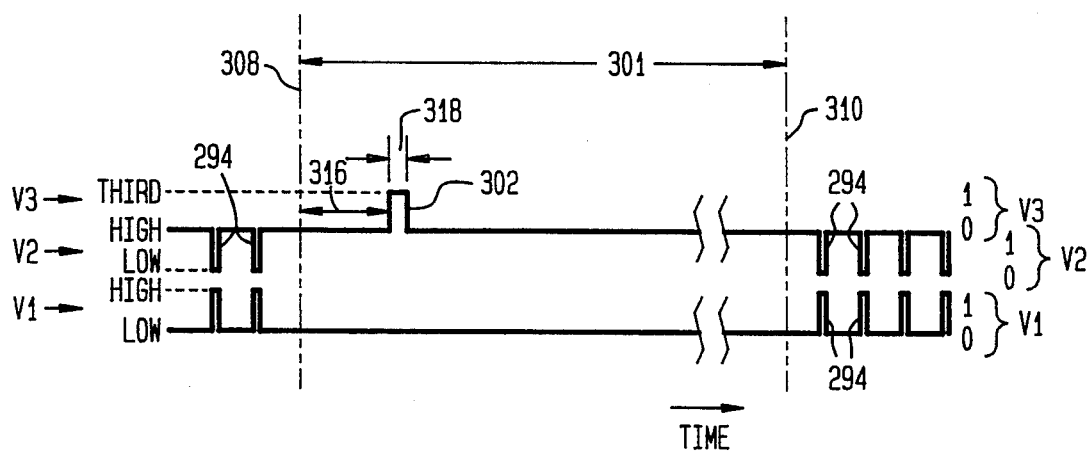
FIG. 8 shows enlarged portions of the vertical control signals of FIG. 7 and schematically illustrates their relation to each other.

Referring now to FIG. 8, there are schematically shown, the beginning of a portion of each of the vertical control signals V1 and V2 which are shown enlarged as compared to FIG. 7. A frame shift pulse 302 of the vertical control signal V3 is also shown in relation to the signals V1 and V2. Time (not exactly to scale) is indicated along the horizontal axis and signal logic levels of "0" and "1" and combined levels illustrating "low", "high" and "third" logic levels are indicated along the vertical axis. After the last vertical shift pulse 294 (see also FIG. 6) in a preceding field portion there is the blanked-out time interval 301 (see also FIG. 7) at the beginning of the next field portion of the vertical control signals V1 and V2. The blanked-out interval 301 (selectably determined by the timer 78 as will be explained shortly) begins at a time indicated by a dashed vertical line 308 and ends at a time indicated by a dashed vertical line 310. During the blanked-out interval 301, the vertical sync pulses 294 are eliminated from the vertical control signals V1 and V2. Each blanked-out interval 301 is precisely referenced to the HD signal (lead 104) and to the VDF signal (lead 107) as will be explained shortly. It should be noted that for the sake of illustration here, the position of the vertical control signal V2 is shown above the position of the signal V1.

A frame shift pulse 302 of the vertical control signal V3 is shown for the sake of explanation superimposed on (though not part of) the vertical control signal V2. The pulse 302 begins a short interval, indicated by 316, after the beginning at the time 308 of the blanked-out interval 301. The duration of the pulse 302 is indicated by 318. The generation by the logic system 14 of the frame shift pulses 302 of the vertical control signal V3, and the blanked-out interval 301 of the vertical control signals V1 and V2 will be described in detail hereinafter.

The presence of the frame shift pulse 302 of the vertical control signal V3 in effect provides, as shown here, a "third" signal logic level in addition to the two logic levels "low" and "high" of the vertical control signal V2 by itself. This permits the drive circuits (not shown) within the CCD image sensor 12 to recognize each frame shift pulse 302 of the vertical control signal V3 as a command to shift all of the lines of pixel image signals of a vertical frame into the vertical registers 54.

Figure 9:
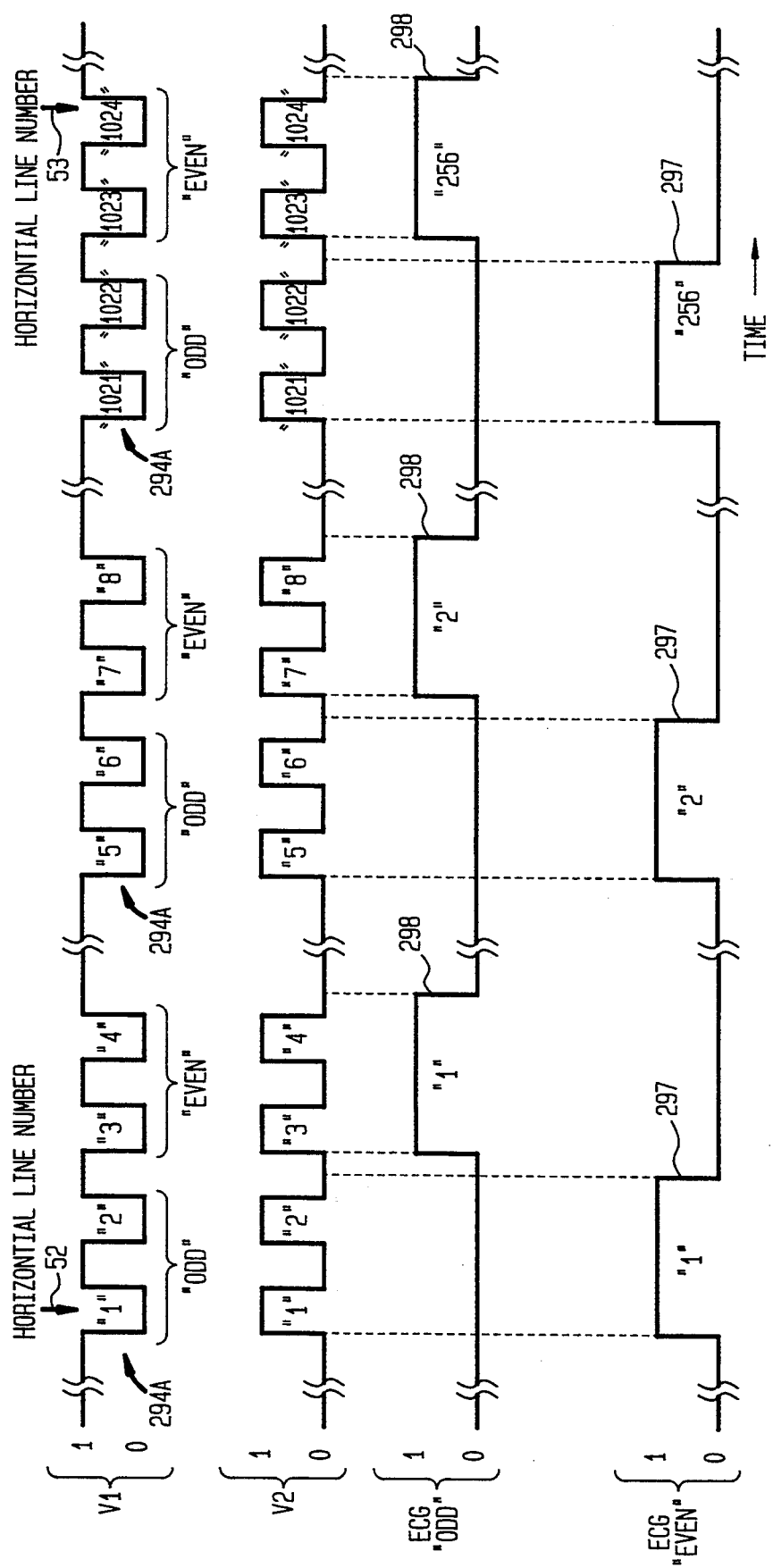
FIG. 9 is a schematic illustration of enlarged portions of vertical control and other signals provided in accordance with the invention for a modified mode of operation of the CCD image sensor of FIG. 1.

Referring now to FIG. 9, there are shown enlarged, partially broken away and not to scale, schematic illustrations of vertical control and other signals for a modified mode of operation of the imaging system 10. Time is indicated along a horizontal axis and logic levels "0" and "1" along a vertical axis. The switch 18 is in its "up" position and quadruple pulses 294A are generated (see also FIG. 6). The vertical control signal V1 and its complement V2 are shown with "odd" and "even" groupings of the quadruple pulses 294A and of the horizontal lines of image signals. Following the example given previously, the consecutive horizontal line numbers of the CCD image sensor 12 from the first line indicated by the vertical arrow 52 (see also FIG. 1) to the last line indicated by the vertical arrow 53 with their respective numbers "1", "2", "3", "4", "5", "6", "7", "8", and so on, to lines "1021", "1022", "1023", and "1024", are as is shown.

Positioned, by way of example, below the V1 and V2 vertical control signals are a timed sequence of "odd" ECG signal pulses 298 (see also FIG. 6), and a separate timed sequence of "even" ECG signal pulses 297. By way of example, the ECG pulses 298 and 297 each have a number sequence of "1", "2", and so on, to "256". It should be noted that the number 1024 is an integral multiple (i.e. four) of 256. Thus grouping of the lines into 256 quadruples accounts for all 1024 of the horizontal lines. Of course, when a purely sequential mode of operation (switch 18 "down") is employed no ECG signals are present, and only single pulses 294 occur.

As was explained previously, whenever an ECG signal (a pulse 297 or a pulse 298) is present on the lead 42, the ECG array 58 "dumps" or drains to a source a horizontal line of pixel image signals received from the vertical registers 54 instead of shifting that line into the line pixel register 60. Thus, as seen in FIG. 9, two successive horizontal lines designated "even" (e.g., the lines "3" and "4", the lines "7" and "8", etc.) are "dumped" by the ECG array 58 during the "odd" sequence of ECG pulses 298. The "odd" lines (e.g., the lines "1" and "2", the lines "5" and "6", etc.) which occur when an "odd" ECG pulse 298 is not present are shifted through the ECG array 58 into the line pixel register 60. In other words, when the "odd" sequence of ECG pulses 298 is selectably applied to the lead 42 by the logic unit 84 (FIG. 2), the first two of the four pulses 294A shift a first two horizontal lines of pixel image signals through the ECG array 58 and into the line pixel register 60. The second two of the four pulses 298A shift the next two successive lines of pixel image signals into the ECG array 58 which thereupon "dumps" them because an "odd" ECG pulse 298 is then present.

Conversely, when the sequence of "even" ECG pulses 297 is selectably applied to the lead 42 by the logic unit 84, only the "even" pairs of lines (e.g., "3" and "4", "7" and "8", and so on) reach the line pixel register 60 in response to the four vertical shift pulses 294A. In this way pairs of 256 "odd" and 256 "even" lines of pixel image signals are applied to the line pixel register 60 and composite lines of video signals are obtained from the CCD image sensor 12. These "odd" and "even" groups of composite lines of video signals are then displayed as "interlaced fields" of video signals on the viewfinder display 20.

Figure 10:
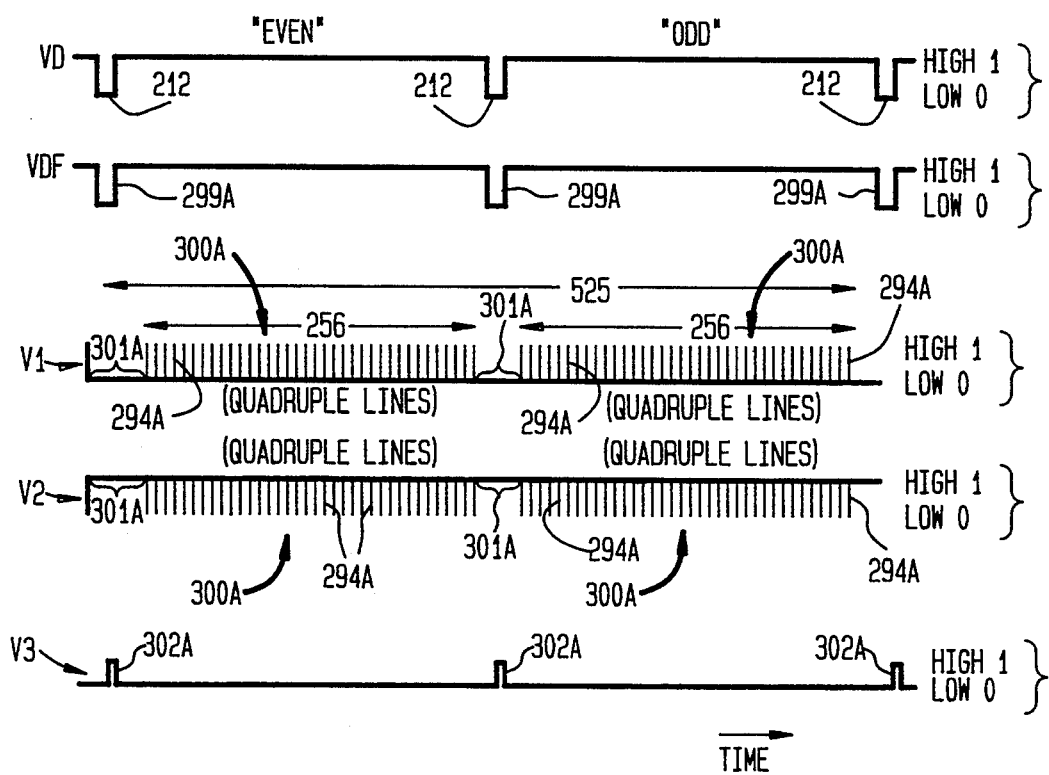
FIG. 10 is a further schematic illustration of vertical control and other signals corresponding to the modified mode of operation and showing "even" and "odd" groups of lines of video signals suitable for viewing on a standard television viewfinder display.

Referring now to FIG. 10, there are shown time relationships of various signals generated by the logic system 14 for the modified mode of operation of the CCD image sensor 12. Time is indicated along a horizontal axis and logic levels along a vertical axis (similar to FIG. 7). The switch 18 for the modified mode of operation illustrated here has been set by the control means 34 in the "up" position and the astable timer 74 generates the four vertical shift pulses 294A (FIG. 6). The logic/counter 80 is set by the control means 34 to generate a VDF pulse 299A for each VD pulse 212 (three shown here). There is a V3 pulse 302A for each VDF pulse 299A. The vertical control signals V1 and V2 now each comprise vertical clock cycles 300A, each cycle 300A in turn comprising "256" of the quadruple pulses 294A (each of the quadruple pulses 294A being shown here for convenience as a single pulse and not all being shown). There is a blanked-out interval 301A at the beginning of each of the cycles of the vertical clock 300A. With each V3 frame shift pulse 302A there are 1024 horizontal lines of pixel image signals shifted into the vertical registers 54. Then these lines are sequentially outputted as 256 "quadruple lines" from the vertical registers 54 to the ECG array 58. From there a selected two of each four lines are "dumped" and the remaining two lines outputted as composite lines of video signals from the CCD image sensor 12, as was explained previously. The resulting "odd" and "even" groups of 256 composite lines of video signals, though different from "even" and "odd" fields of single lines of video signals as in standard TV signals, are nonetheless directly viewable as a TV picture on the viewfinder display 20.

Following the example given above, for the purely sequential mode of operation, the duration of the blanked-out intervals 301 (FIG. 7) is chosen as twenty-six line-times (26 H). This duration is determined by a first selected signal (not shown) from the timer 78 under control of the control means 34, as will be explained shortly. Making each interval 301 equal to 26 H plus the 1024 lines in the example given, accounts for a total time duration of 1050 lines required for two standard TV frames of 525 lines/frame, as shown in FIG. 7. On the other hand, for the modified mode of operation (switch 18 "up"), the duration of the blanked-out intervals 301A, illustrated in FIG. 10, is chosen as 6 line-times (6 H). This duration of 6 H (determined by a second selected signal from the timer 78) plus an interval of 256 "quadruple lines" accounts for 262 lines for each "odd" and "even" field. Neglecting a half-line difference, this conforms to 525 lines per standard TV frame for an "odd" and an "even" field together.

The frame shift pulse 302 (and also the pulse 302A) of the vertical control signal V3 begins about two line-times (interval 316) after the blanked-out interval 301 begins (see FIG. 8). The pulse 302 (and the pulse 302A of FIG. 10) has a duration of about one line-time.

In the modified mode of operation of the CCD image sensor 12 illustrated in FIGS. 9 and 10 (switch 18 "up"), the first four (quadruple) vertical sync pulses 294A which occur after each "odd" and after each "even" blanked-out interval 301A ends occur at the precise time required (see FIG. 3) for synchronized viewing on the television viewfinder display 20 in interlaced format of the "odd" and "even" groups of composite of video signals from the CCD image sensor 12.

The logic/counter 80 (FIG. 2) is selectably set by the control means 34 to generate, during the sequential scan mode of operation (switch 18 "down"), a single pulse 299 of the VDF signal (lead 107) in response to every four pulses 212 of the VD signal (as shown in FIG. 7). When the imaging system 10 is set for the modified mode of operation (switch 18 "up") in which the analog video signal is applied to the viewfinder display 20, the logic/counter 80 generates a VDF signal pulse 299A for each VD signal pulse 212 (FIG. 10). The timer 78 responds to each VDF signal pulse 299, or pulse 299A, and, selectably controlled by the control means 34, generates a signal on the lead 112 corresponding to the blanked-out intervals 301 (FIG. 7) or the shorter blanked-out intervals 301A (FIG. 10).

The complementary vertical control signals V1 and V2 (leads 38 and 39) of FIG. 7 or alternatively FIG. 10 are selectably generated by the logic unit 84 from a logical combination of the single timed pulse 294 or quadruple pulses 294A (FIG. 6) generated by the astable timer 74 (lead 114), and a signal (not shown) selectably generated by the timer 78 (lead 112) and having a duration equal to the blanked-out interval 301 (FIG. 7) or the blanked-out interval 301A (FIG. 10). The "odd" and "even" sequences of ECG signals (lead 42) applied to the ECG array 58 are selectably generated by the logic unit 84 from a logical combination of the pulses 297 and 298 (FIG. 6) from the timers 75 and 76, and the field-indicator signal (FLD) on the lead 108.

The 4-bit counter 81 is enabled by the signal (not shown but lasting for the interval 301 or 301A) generated by the timer 78 on the lead 112. Thereafter, in response to the HD signal on the lead 104, the 4-bit counter 81 generates binary bit pulses (not shown) representing "one", "two", "four" and "eight" line-times on the respective leads 120, 121, 122 and 123. The logic unit 86 receives these binary bit pulses (not shown) and logically combines them. In response to its input signals, the logic unit 86 generates the frame shift pulses 302 (or pulses 302A) of the vertical control signal V3 and applies them to the lead 40. The timing and referencing of the frame shift pulses 302 (or 302A) of the vertical control signal V3, and the blanked-out intervals 301 (or 301A) of the complementary vertical control signals V1 and V2 have previously been described (FIGS. 7, 8 and 10).

The seemingly complex task of generating "standard" (NTSC) sync and control signals needed by a television viewfinder with a limited number of lines per frame on the one hand, and the generating of precisely referenced though substantially different horizontal and vertical control signals needed by a high resolution CCD image sensor with a much larger number of lines per frame for a purely sequential mode of operation on the other hand, is accomplished in a simple and highly effective way by the above described apparatus and method provided in accordance with the present invention. The logic system 14 is controlled in absolute synchronism by a single frequency generator 64 operating at a pre-determined multiple of a standard frequency sub-carrier "fsc". A standard timing generator 70 operates at a multiple (e.g., 4) of the "fsc" to produce standard sync and control signals for a conventional television system. The pixel clock generator 66 generates a pixel clock 290 having a number of pixel timing pulses 292 per cycle selected in accordance with the particular CCD image sensor 12 used with the logic system 14. The HD signal, the FDL signal, and the VD signal from the standard timing generator 70, and the pixel clock from the pixel clock generator 66 are then applied to another portion (comprising a small number of inexpensive components which may be purchased off-the-shelf) of the logic system 14. This portion of the logic system 14 selectably generates the horizontal and vertical control signals and the ECG signals needed by the CCD image sensor 12 for a purely sequential mode of operation on the one hand, and for a modified mode of operation on the other hand, as previously described. These horizontal and vertical control signals and ECG signals are inherently referenced to and synchronized with a television standard (e.g., NTSC). There is no redundancy of elements in this new logic system 14 and thus it is highly cost effective.

The standard timing generator 70 can be Part No. CX-7930A NTSC, PALM from Sony Corporation. It provides output sync and control signals in accordance with the NTSC standard, and also the PAL standard.

The timers 72, 73, astable timer 74, and timers 75, 76 and 78 can each be part Number 74HC123 from Texas Instruments Co. The logic/counter 80 and logic units 82, 84 and 86 comprising logic gates, counters and inverters can be part numbers 74HC00, 74HC04, 74HC08, and 74HC32, respectively, from Texas Instruments. The pixel clock generator 66 is a commercially available pulse generator. The various other components employed in the logic unit 14 are well known in the art and are commercially available from a number of suppliers.

Various changes in the apparatus and method disclosed may occur to those skilled in the art and can be made without departing from the spirit and scope of the invention as set forth in the accompanying claims. For example, the invention is not limited to a particular number of horizontal lines (e.g., 1024) in a CCD image sensor, or to a given television standard (e.g., NTSC), or to the particular components of the logic system 14 which have been specifically described. Still further, modifications in the sequences of generating the horizontal control signals, the vertical control signals, and the ECG signals for the CCD image sensor 12 by the logic system 14 may be made without departing from the invention.

What is claimed is:

1. A logic system for generating synchronizing (sync) and control signals in accordance with a television standard and for selectably generating horizontal, vertical, and gate control signals as required by a high resolution charge coupled device (CCD) image sensor having a large number of horizontal lines of image signals per vertical frame for a purely sequential mode of outputting all of the lines of image signals and alternatively for a modified mode of outputting in which a reduced number of the lines of image signals are viewable directly on a standard television display, the logic system comprising:

timing generator means for generating standard sync and control signals in accordance with a television standard, the timing generator means being referenced to a standard frequency;

pixel clock generating means for providing pixel clock signals having repeating cycles each of which has a pre-determined number of pixel timing pulses in accordance with requirements of the CCD image sensor, the pixel clock generating means being referenced to the standard frequency; and selectably controlled timing and logic means, which is driven by pixel clock and standard sync and control signals, for generating horizontal, vertical, and gate control signals for the CCD image sensor as needed for a purely sequential mode of outputting of all of the horizontal lines of pixel image signals of a vertical frame line-by-line from the CCD image sensor and alternatively as needed for a modified mode of outputting from the CCD image sensor of interlaced groups of a reduced number of horizontal lines of pixel image signals in odd and even fields of vertical frames of a television picture.

2. The logic system of claim 1 wherein the selectably controlled timing and logic means comprises:

a plurality of timers adapted to provide respective pulses of pre-determined durations referenced to ones of the standard sync and control signals;

first logic means for generating the horizontal control signals from a logical combination of the pixel clock and at least one of the respective pulses;

second logic means for selectably generating vertical shift and gate control signals from a logical combination of ones of the respective pulses and the standard sync and control signals;

third logic means for selectably generating frame shift vertical control signals from a logical combination of others of the respective pulses; and control means coupled to the timing and logic means for selectably controlling them in unison to provide vertical control signals for purely sequential line-by-line readout of all of the lines of a vertical frame of pixel image signals from the CCD image sensor and alternatively to provide vertical control and gate control signals for modified readout of interlaced groups of a reduced number of horizontal lines of pixel image signals in even and odd fields of a vertical frame of a television picture such that images can be selectably viewed directly on a standard television display or utilized sequentially in optimized form in a high resolution picture unit.

3. The logic system of claim 2 wherein the timing generator means operates in accordance with a national television standards committee (NTSC) standard requiring 525 horizontal lines of a vertical frame in interlaced even and odd fields, and the CCD image sensor has 1024 horizontal lines; and the timing and logic means are selectably controlled by the control means to output sequentially all 1024 of the horizontal lines of a vertical frame of pixel image signals from the CCD image sensor, and alternatively to output interlaced groups of 256 lines from the CCD image sensor in even and odd fields of a television standard.

4. The logic system of claim 1 wherein the selectably controlled timing and logic means comprises:

a plurality of timers adapted to generate timer signals having respective durations and being referenced to ones of the timer signals and the standard sync and control signals, at least one of the timer signals being selectable in duration and another timer signal being selectable as a single pulse or multiple pulses;

first logic means for generating the horizontal control signals from a logical combination of the pixel clock and at least one of the timer signals;

second logic means for selectably generating vertical shift and gate control signals from a logical combination of ones of the timer signals, the single and multiple pulses and standard sync and control signals;

third logic means for selectably generating frame shift vertical control signals from a logical combination of a timer signal and standard sync and control signals; and control means coupled to ones of the timers and logic means for selectably controlling them in unison to provide frame shift and vertical shift signals for purely sequential high resolution line-by-line readout of all of the lines of pixel image signals from the CCD image sensor and alternatively to provide frame shift, vertical shift, and gate control signals for interlaced readout of even and odd groups of lines of pixel image signals in accordance with the television standard.

5. A logic system for generating standard synchronizing (sync) and control signals in accordance with a television standard and for generating horizontal and vertical control signals required by a high resolution charge coupled device (CCD) image sensor for alternative modes of operation, the logic system comprising:

a frequency generator adapted to provide signals referenced to a standard television frequency subcarrier (fsc);

a standard timing generator adapted to be driven by a signal from the frequency generator and adapted to provide standard sync and control signals in accordance with a television standard;

a plurality of timers adapted to generate signals having respective durations and being precisely referenced to each other and to ones of the standard sync and control signals;

a pixel clock generator adapted to generate a pixel clock, the pixel clock generator being adapted to be driven by a signal from the frequency generator;

a plurality of logic units adapted to generate horizontal, vertical, and gate CCD control signals from a logical combination of respective ones of the pixel clock, the timer signals, and the standard sync and control signals; and control means for controlling selected ones of the timers and the logic units to provide for a purely sequential mode of operation of the CCD image sensor in which single horizontal lines of pixel image signals are outputted line-by-line for each frame of a picture and to provide for a modified mode of operation in which groups of horizontal lines of pixel image signals are selected by the gate CCD control signals and outputted in interlaced even and odd fields of a television picture frame and non-selected groups of horizontal lines are disposed of.

6. The logic system of claim 5 in which the logic units generate a selectable number of vertical shift pulses in one vertical control signal, generate a selectable number of frame shift pulses in another vertical control signal, and generate even and odd sequences of the gate CCD control signals, the numbers of the vertical shift pulses, the frame shift pulses and gate CCD control signals being selected by the control means in accordance with the sequential mode and the modified mode of operation of the CCD image sensor.

7. The logic system of claim 5 wherein:

the plurality of timers comprise first, second, third, and fourth fixed timers, an astable timer, and a selectably controlled timer;

the plurality of logic units comprise first, second, and third logic units, and a logic/counter; and the control means is adapted to actuate signal selectors in one of the logic units, in the logic/counter, and in the selectably controlled timer.

8. The logic system of claim 7 wherein the astable timer is adapted to be controlled by a signal selector in one of the logic units, and the logic/counter is adapted to control the selectably controlled timer.

9. A method for controlling a CCD image sensor having a large number of horizontal lines of video signals per frame to obtain a reduced number of lines of video signals synchronized in interlaced groups of even and odd fields for display in accordance with a television standard and alternatively to obtain all of the lines of video signals from the CCD image sensor outputted sequentially for optimum utilization by a high resolution picture unit, the method comprising the steps of:

generating standard sync and control signals as required by a standard television display;

generating a pixel clock;

generating a plurality of timed pulses referenced to the standard signals;

generating horizontal CCD control signals from a logical combination of the pixel clock and ones of the timed pulses;

generating vertical CCD control signals having a selectable number of vertical shift pulses from a logical combination of ones of the timed pulses;

generating vertical CCD control signals having a selectable number of frame shift pulses from a logical combination of ones of the timed pulses and the standard signals;

generating gate control signals for disposing of selected numbers of horizontal lines of video signals from the CCD image sensor from a logical combination of ones of the standard signals and timed pulses; and selecting the numbers of vertical shift pulses and frame shift pulses in accordance with a purely sequential mode of outputting single horizontal lines of pixel image signals from the CCD image sensor and alternatively selecting the numbers of vertical shift pulses, frame shift pulses and gate control signals in accordance with a modified mode of outputting lines of pixel image signals in interlaced groups of even and odd fields of the television standard.

10. The method of claim 9 wherein:

single vertical shift pulses corresponding respectively to each line of the CCD image sensor are generated for the sequential mode of operation, and multiples of vertical shift pulses corresponding respectively to multiple lines of the CCD image sensor are generated for the modified mode of operation;

a single frame shift pulse corresponding to a frame of lines of the CCD image sensor is generated for the sequential mode of operation, and a plurality of frame shift pulses corresponding respectively to even and odd fields of a television picture frame are generated in the modified mode of operation; and even and odd sequences of gate control signals are generated for the modified mode of operation and no gate control signals are generated for the sequential mode such that the full number of lines of image signals are obtained from the CCD image sensor in the sequential mode.

11. The method of claim 9 wherein the multiples of vertical shift pulses are quadruple pulses which shift four horizontal lines, and the odd sequence of gate control signals selectively disposes of the last two of the four horizontal lines shifted by the quadruple pulses, and the even sequence of gate control signals selectively disposes of the first two of the four horizontal lines such that a reduced number of lines are obtained in interlaced groups of even and odd fields of the television standard.

* * * * *